Nov. 11, 1969     T. F. FLAVIN     3,477,252
SLIP CLUTCH

Filed Jan. 18, 1968     2 Sheets-Sheet 1

INVENTOR
THEODORE F. FLAVIN

BY *William K. Barret*
ATTORNEY

Nov. 11, 1969    T. F. FLAVIN    3,477,252
SLIP CLUTCH
Filed Jan. 18, 1968    2 Sheets-Sheet 2
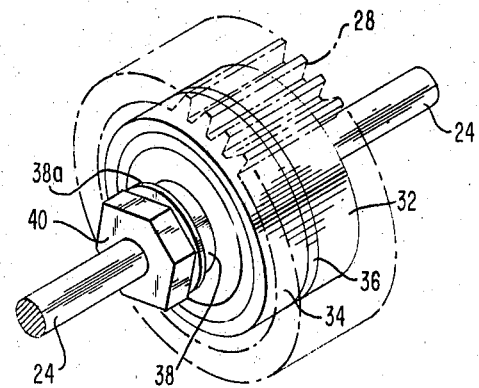
FIG. 2
FIG. 3
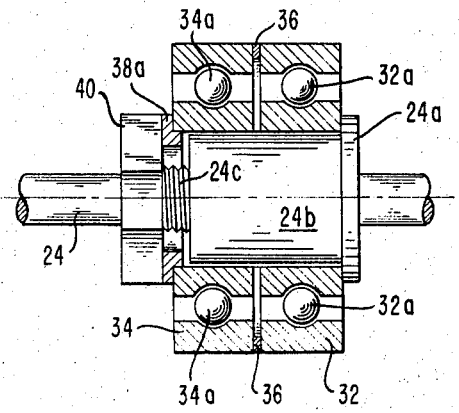
FIG. 4
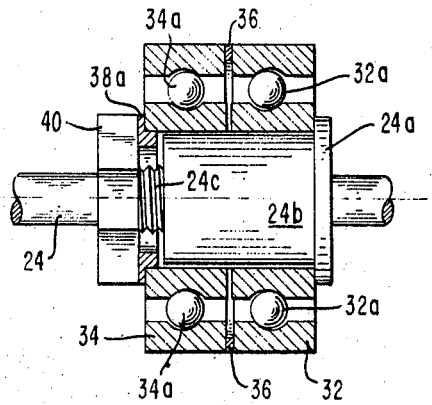

United States Patent Office 3,477,252
Patented Nov. 11, 1969

3,477,252
SLIP CLUTCH
Theodore F. Flavin, Owego, N.Y., assignor to International Business Machines Corporation, Armonk, N.Y., a corporation of New York
Filed Jan. 18, 1968, Ser. No. 698,868
Int. Cl. F16d 7/02
U.S. Cl. 64—30          3 Claims

ABSTRACT OF THE DISCLOSURE

Two ball bearings are mounted on a shaft contiguously. The outer races of these ball bearings are spaced apart by a ring while the inner races are biased toward one another by means of fasteners fixed to the shaft. Sufficient thrust is applied to inner races to cause the races to revolve together when rotational force is applied to the outer race unless the inner race is held from rotation. The thrust applied is less than the thrust which would damage the bearing.

BACKGROUND OF THE INVENTION

Field of the invention

The invention is directed to a slip clutch.

Description of the prior art

The patent to Erban, Re. 18,175 shows an inner race, an outer race and balls between the same where there is sufficient thrust to cause the balls to rotate and provide a torque. The concept of a slip clutch in which motion is transmitted through non-rotation of the balls and races and in which the driving motion is not transmitted by allowing the balls to rotate is not shown.

A slip clutch which is economical and reliable has not been available. The present invention satisfies this need.

SUMMARY

The invention is a slip clutch wherein a motive force continuously applied to one race is transferred to the other race through ball bearings between said races where the frictional forces between balls and races are greater than the motive force applied, but of a magnitude such as to allow rotation of balls and a single race, where one race is restrained from movement.

It is an object of the present invention to provide a slip clutch which is simple, economical and dependable.

The foregoing and other objects, features and advantages of the invention will be apparent from the following more particular description of a preferred embodiment of the invention as illustrated in the accompanying drawings.

Description of drawings

FIGURE 2 is a perspective view of the invention.
FIGURE 3 is a cross section of the invention.
FIGURE 4 is a cross section of the invention with the elements of the structure in exaggerated position to more clearly show the operation.

Detailed description of the preferred embodiment

Figure 1:
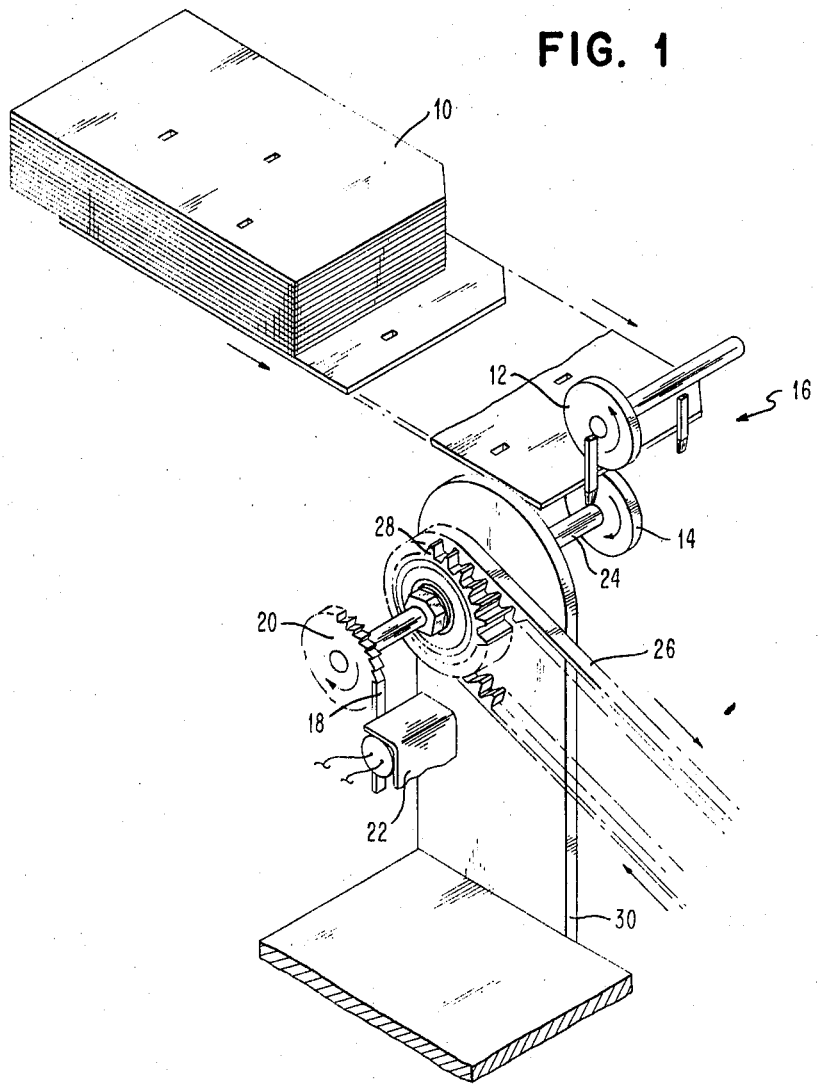
FIG. 1 is a schematic illustration of the slip clutch as utilized in a punch card reader.

In FIG. 1 is shown an apparatus for reading perforations in punched cards. The cards 10 are fed singly by a feed knife (not shown) into feed rolls 12 and 14. Feed roll 12 is an idler roll and acts to hold cards 10 against a driving roll 14.

The perforations in the cards are encoded by column and the cards are fed by column beneath sensing brushes 16 which determine, by completion of electrical circuits the encoded data contained in each column. The reading is performed by incrementally stepping the card for each column of data. A column of the perforated card is sensed by the brushes 16 and transferred to a utilization device (not shown). When the next column is to be read, an armature 18 is moved from a ratchet 20 to allow the driving roll 14 to move the card so that the next column of the card is beneath sensing brushes 16. An electromagnet 22 is shown as the operating means for the armature 18.

The driving roll 14 is attached to a shaft 24 on which the invention of the present application is a part. Motion is supplied by a toothed belt 26 driven by a motor (not shown). The teeth on the belt coact with a toothed ring 28. The ring 28 is fitted to the slip clutch to transfer motion to the same. The ring here shown was of plastic and was pressure fitted to the outer cases of the ball bearings forming the slip clutch. It is apparent that whether the ring 28 is plastic or metal or whether the same is pressure fitted or not is immaterial. The shaft 24 and other elements of the punched card reader are shown supported by suitable means such as 30.

The short description above is intended to orient the invention in an environmental application in which it has been used. It will be however apparent that the inventive concept is not concerned with the movement of punched card specifically but is adaptable to any application requiring a slip clutch where the torque requirements can be satisfied.

The clutch which has been used in the card reader is substantially one-half the size shown in FIGS. 3 and 4. The ball bearings are R–8, ½″ I.D.; 1⅛″ O.D.; ball size 9/16″ diameter; 8 in number. With 225 pounds of thrust, there is .3 inch pound torque transmitted.

Referring to FIG. 2, shaft 24 is shown with two ball bearings 32 and 34. A ring 36 is positioned between these ball bearings contiguous to the outer race of each ball bearing. A thrust washer 38 with an outside diameter to match the inside diameter of the ball bearings engages the inner race of the ball bearing 34 with a flange 38a. A nut 40 is tightened to apply an axial force to the ring 38 and consequently to the inner race of ball bearing 34.

Shaft 24 has a shoulder 24a, a threaded section 24c and a stepped section 24b, FIG. 3. The stepped section 24b accepts ball bearings 32 and 34. The ball bearings are standard bearings obtainable commercially. The ring 36 prevents inward movements of the outer races of the ball bearings. The shoulder 24a of shaft 24 and the flange 38a of ring 38 apply an axial load to the inner races of ball bearings 32 and 34. Not shown in FIGS. 3 and 4 are the separators which space the balls in the races. Those are part of most commercial bearings in the sizes shown.

When the axial load is applied to the inner races, the balls within the races are forced against the races to increase the frictional forces to such an extent that movement of one race is sufficient to move the other race. However, one race may be held, while the other is rotated without harm to the ball bearings so long as the limits set for the bearing are not exceeded. The thrust, for example, should not exceed the ratings given by the ball bearing manufacturers. Lubrication of the bearings are obviously required. There will be variations in the output torque dependent on the specific lubricant.

In FIG. 4, is shown the result of applying thrust to the inner races while preventing movement of the outer races. The balls 32a, 34a are forced against the shoulders of the races and there is increased frictional force resulting between the balls and races.

Instead of the races being freely rotatable, the present invention provides sufficient thrust so that the races revolve together when the load on either race is less than the frictional forces between the balls and the races. Where this load exceeds the forces, such as by detenting, as shown in the present application, the outer race rotates and no motion is transmitted to the shaft on which the inner race is mounted.

The apparatus shown has been successfully operated for a long period of time without failure. It provides an inexpensive solution to a motion transmitting arrangement where one was not previously available.

It is apparent that the specific arrangement shown using ball bearings is illustrative only. Tapered bearings can also be used. It is also apparent that the motion input into or out of the clutch can be varied to suit the application.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A coupling for developing a controlled go-stop low-level output torque from a continuously driven input including:
    a bearing with an inner race, an outer race and rolling means between said races,
    means for applying a lateral force to one of said races to increase the frictional forces between said bearing means and said races sufficient for movement of one race to result in movement of the other race but less than the force which would destroy the bearing surfaces,
    means for imparting a continuous drive to one of said races to impart rotation thereto, said drive generating a rotational velocity equal to the velocity required during said go period,
    means for applying said output to establish movement of an article to be controlled,
    means responsive to predetermined movement of said controlled article for establishing a controlled stop-go force,
    means for inhibiting movement of said other race in response to said stop-go force,
    wherein periods of stop-go movement are based on movement of said controlled article.

2. A coupling for developing a controlled go-stop low-level output torque from a continuously driven input including:
    two ball bearings mounted contiguously on a common shaft, said ball bearings including an inner race, an outer race and balls therebetween,
    a spacer between said outer races,
    means for applying a lateral force to each inner race sufficient to increase the frictional forces between races and balls so that inner and outer races will revolve together but less than the force which would destroy the bearing surfaces, said forces being of the following order and consistent with the following example:
        225 pounds of thrust applied to ball bearings R-8 ½" I.D., 1⅛" O.D., ball size 3/16", 8 in number where transmitted torque is .3 inch pound, and
    means for imparting a continuous drive to one of said races to impart rotation thereto, said drive generating a rotational velocity equal to the velocity required during said go period,
    means for applying said output to establish movement of an article to be controlled,
    means responsive to predetermined movement of said controlled article for establishing a controlled stop-go force,
    means for inhibiting movement of said other race in response to said stop-go force,
    wherein periods of stop-go movement are based on movement of said controlled article.

3. The apparatus of claim 2 including:
    spaced locking means on said shaft for securing said bearings thereto, and
    a sleeve mounted on said outer races to couple motion thereto.

References Cited

UNITED STATES PATENTS

| | | | |
|---|---|---|---|
| 1,612,954 | 1/1927 | Trbojevich | 64—30 X |
| 1,781,173 | 11/1930 | Green | 64—30 |
| 2,132,928 | 10/1938 | Blanchard | 64—30 |
| 2,974,504 | 3/1961 | Johnson | 64—30 |
| 3,221,855 | 12/1965 | Newlin | 192—12 X |
| 3,392,811 | 7/1968 | Heisler | 192—12 |

HALL C. COE, Primary Examiner

U.S. Cl. X.R.

192—12